United States Patent [19]

Wenzel et al.

[11] 4,044,289

[45] Aug. 23, 1977

[54] CYCLING SYSTEM FOR TRACER-CONTROLLED MACHINE TOOLS

[75] Inventors: Robert H. Wenzel, Orange; Franklin O. Stavros, Pomona, both of Calif.

[73] Assignee: Textron Inc., Providence, R.I.

[21] Appl. No.: 608,217

[22] Filed: Aug. 27, 1975

Related U.S. Application Data

[63] Continuation of Ser. No. 455,019, March 26, 1974, abandoned.

[51] Int. Cl.² .......................................... G05B 19/36
[52] U.S. Cl. ................................ 318/571; 318/578; 318/39; 90/13.5
[58] Field of Search .................... 318/39, 571, 578; 90/13.5

[56] References Cited

U.S. PATENT DOCUMENTS

| | | | |
|---|---|---|---|
| 2,492,731 | 12/1949 | Branson | 318/39 |
| 2,511,956 | 6/1950 | Wetzel | 318/578 X |
| 2,828,673 | 4/1958 | Campbell | 90/13.5 |
| 2,843,024 | 6/1958 | Armitage | 90/13.5 |
| 2,946,265 | 6/1960 | Fuldner | 90/13.5 |
| 3,121,370 | 2/1964 | Larsen | 90/13.5 |
| 3,292,495 | 12/1966 | Hill | 90/13.5 |
| 3,582,749 | 6/1971 | Wenzel | 318/571 |
| 3,707,662 | 12/1972 | Hoffman | 318/578 |
| 3,976,928 | 8/1976 | Wenzel | 318/578 |

*Primary Examiner*—B. Dobeck
*Attorney, Agent, or Firm*—Donald D. Mon

[57] ABSTRACT

Apparatus and method for cycling elements of a tracer mechanism-controlled machine tool in a trace cut along a selected tracing plane defined by first and second mutually perpendicular axes under control of two power control means respective to the selected axes, and at the end of the trace cut, selecting a pick plane for pick movement, which pick plane includes one of the previously-selected axes and a third axis which is normal to the first and second axes, accomplishing the pick movement under control of two power control means respective to the axes which define the pick plane, and after distance measuring means has indicated completion of a predetermined travel along the third axis, to terminate the pick movement and again select the first two selected axes for a trace cut in a direction opposite to the first trace cut. Machine tool elements are moved by motor means responsive to the power control means. During the trace cut and pick movements, the motors are always under the concurrent control of two stylus-responsive power control means which are respective to tracer stylus deflection in the axes that define the respective plane. A substantially constant cutting speed is therby produced both during the trace cut and during the pick movement.

8 Claims, 10 Drawing Figures

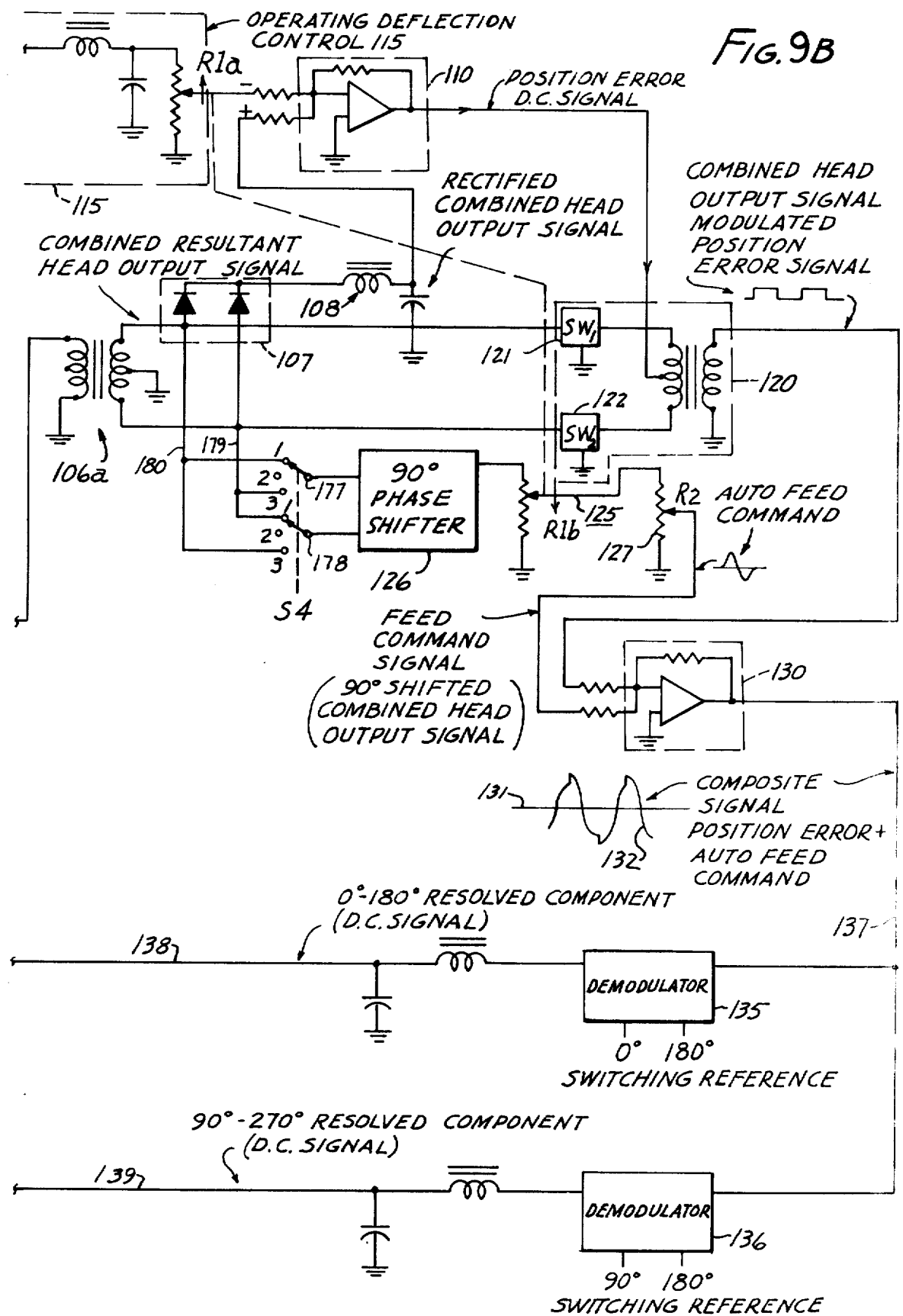

CYCLING SYSTEM FOR TRACER-CONTROLLED MACHINE TOOLS

This is a continuation, of application Ser. No. 455,019, filed Mar. 26, 1974, now abandoned.

This invention relates to tracer-controlled machine tools.

In the operation of tracer-controlled machine tools, particularly during die-sinking operations, it is customary practice to make a trace cut in a first tracing plane, then when that trace cut is completed, to pick (or "step") over to a new tracing plane spaced from the first by means of what is called a "pick" movement. When the pick movement is completed, another trace cut is made in a plane parallel to the first trace cut, but in the opposite direction. This sequence is continued so as to provide a back and forth operation along spaced-apart planes until the entire surface of a pattern has been traced by the stylus of a tracer mechanism..

It is best practice for the cutter which duplicates in a workpiece the contour of the pattern to move over the pattern at a substantially constant surface rate of movement. This is a known objective, and means for attaining it is shown in the prior art, for example in Wenzel U.S. Pat. No. 3,582,749. Similarly, the cycling of a machine tool element to accomplish the intermittent trace cut and pick movements is also well known. However, what is not known is the control of the machine tool in the pick movement in such manner as to provide a substantially constant surface speed between the cutter and the workpiece during the pick movement. Pick movement is commonly accomplished by disconnecting all or part of the tracer mechanism and shifting the machine tool element along a pick axis at a constant speed. This is a satisfactory technique so long as there is no abrupt climb on the pattern, because if there is, then there is a substantial risk of gouging the workpiece, or of breaking the cutting tool, because the feed rate will not slow down.

It is known to provide a single axis control over the cutting tool during the pick movement, for example a depth control effective on the vertical axis when the machine tool table is being moved in pick feed in the X or Y axis. This partially overcomes the problem and tends to retract the tool in response to a rise in elevation. However, there is no control over the rate of motion in the pick direction, and should the grade become too steep, or for example comprise an abrupt shoulder, the vertical control may not respond fast enough to avoid gouging the workpiece and possibly breaking the cutter. Also, because the rate of surface movement of the cutter will change, the surface finish is adversely affected.

It is an object of this invention to provide cycling means for a machine tool element which will provide intermittent trace cuts and pick movements wherein all of the trace cuts and all of the pick movements are under the control of power control means associated with the tracer mechanism in the two axes which define the plane in which the motion is being made, whereby to provide a constant surface speed between the cutter and the workpiece, thereby overcoming the limitations of the prior art and making for a safe pick feed movement which will produce an optimum part.

This invention is carried out in combination with a machine tool that includes a frame and a machine element that supports a pattern for movement along first, second and third mutually perpendicular axes. A first, second and third axis bi-directional motor is adapted to drive the machine tool element along first, second and third axes, respectively. A tracer mechanism is mounted to the frame and includes a body and a stylus which has a tip. Mounting means mounts the stylus to the body, and the stylus has a longitudinal axis which is generally aligned with the first axis and is mounted for axial shifting movement along the first axis. The mounting means also provides for lateral movement of the stylus tip in all lateral directions from the first axis. Z axis power control means, Y axis power control means, and X axis power control means are mounted to the body of the tracer mechanism and are responsive to components of stylus tip deflection along the respective first, second and third axes to control the application of power to respective first, second and third axis motors in response to the said stylus deflection.

Axis selector means is provided for selecting two of the power control means to establish a tracing plane and also one of said two and a third power control means whereby to establish a plane for pick movement. Limit means defines the limit of travel of the stylus in the trace cut and causes it to be terminated and causes the axis selector means to select the power control means for the pick movement. Distance measuring means is provided for terminating the pick movement at the conclusion of a predetermined movement along one of the pick axes and is adapted to cause the axis selector means again to select the axes respective to the trace cut to start the next trace cut. All movements in trace cut and in pick movement are under control of at least two power control means which tend to maintain the surface rate of travel constant.

The above and other features of this invention will be fully understood from the following detailed description and the accompanying drawings in which:

FIGS. 9A and 9B are schematic circuit drawings showing the invention, FIGS. 9A and 9B adjoining each other at the right-hand edge of FIG. 9A and at the left-hand edge of FIG. 9B.

Figure 1:
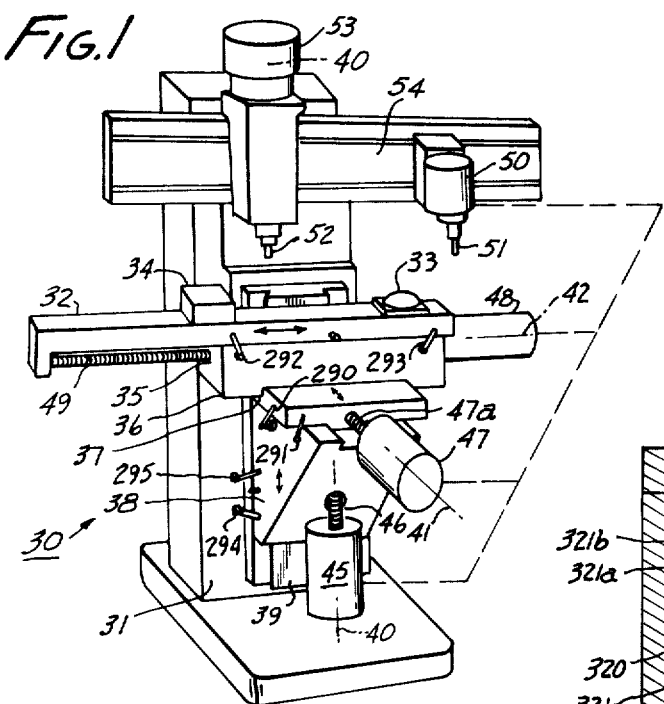
FIG. 1 is a perspective view of a machine tool incorporating the invention.

In FIG. 1, there is shown a tracer-controlled machine 30. It is a conventional tracer-equipped milling machine. The machine includes pedestal base 31, a table 32 upon which are placed a pattern 33 (the term "pattern" including the term "template") and a workpiece 34 in which the contour of the pattern is to be duplicated by cutting it with a cutting tool.

A set of ways 35 mounts the table for right-left movement (X axis) relative to an intermediate member 36. The intermediate member 36 is mounted by ways 37 to a knee 38 for crosswise movement (Y axis). Knee 38 is mounted to the pedestal base 31 by ways 39 for vertical movement (Z axis). For convenience in discussion, the Z, Y and X axes (sometimes herein called first, second and third axes) are respective to ways 39, 37 and 35. The Z, Y and X axes are sometimes referred to as axes 40, 41, 42, respectively.

Movement of the system along the Z axis is caused by actuation of a bi-directional Z axis motor 45 mounted to the base which turns a Z axis lead screw 46 engaged between the motor and the knee. The turning of this lead screw in one direction or the other causes respective up or down movement of the knee. Movement along the Y axis 41 is caused by actuation of bi-directional Y axis motor 47 mounted to the knee which turns a Y axis lead screw 47a engaged between motor 47 and intermediate member 36. Movement along the X axis is caused by actuation of bi-directional X axis motor 48 mounted to the intermediate member which turns an X axis lead screw 49 engaged between the motor and the table.

Motors 45, 47 and 48 are all bi-directionally operable, and therefore the work table can be shifted by appropriate actuation of them so as to assume any position relative to the pedestal base within its limits of movement. It is the function of a tracer mechanism 50 to cause its stylus 51 to scan (to move along) the surface of the pattern 33, whereby the table will be shifted to move the workpiece 34 past a cutter 52 and duplicate the surface of the template in the workpiece.

The cutter is driven (turned) by a motor 53 to perform the cutting operation. It may be an end mill or other type of rotary cutter suited to the intended usage. The tracer mechanism is connected by means (not shown) to controls yet to be described for the purpose of causing the appropriate actuation of the respective motors. The tracer mechanism and the cutter are mounted to a horizontal rail 54 which is rigidly attached to the pedestal base. In addition to the tracer control shown, hand controls may be provided. They perform no part of this invention. Their details are familiar to persons skilled in the art, and are not described herein.

Figure 2:
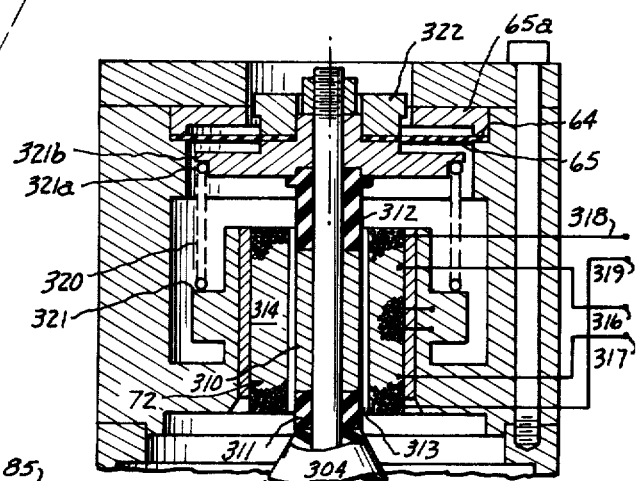
FIG. 2 is an axial cross-section, partly in schematic notation, showing a tracer mechanism useful in this invention.

Tracer mechanism 50, as best shown in FIG. 2, includes a body 60 extending generally along Z axis 40. Stylus 51 is partially enclosed in the body. Its tip 61 projects beyond the lower end 62 of the body, and is free to move laterally in all directions relative to axis 40, i.e., in all directions in the X-Y plane defined by axes 41 and 42. The tip of the stylus can make contact with a pattern 33.

Stylus mounting means 65 is shown as a resilient, thin, flexible steel diaphragm clamped between shoulder 64 on the body and an insert 65a fitted to the body. This mounting means permits the stylus to move axially along axis 40, as well as to swivel as a consequence of movement of the tip laterally to axis 40, and biases the stylus to tend to make it return to the "null" position shown in FIG. 2. The null position is that wherein the axis of the stylus coincides with axis 42, and no active power control means produces a signal which activates a motor to move a machine tool element. Contact with the stylus can cause movement of the stylus tip along any of the three axes, depending on the configuration of the pattern.

X axis power control means 70, Y axis power means 71, and Z axis control means 72 are mounted to the body. They are responsive to changes in position of the stylus relative to the neutral positions shown in FIG. 1. At this position, the central, longitudinal axis of the stylus and Z axis 42 are coincident.

X and Y axis power control means are identical. Therefore, only the X axis means will be described in detail. As can best be seen in FIG. 2, it comprises four U-shaped core members 73, 74, 75 and 76 disposed in pairs on opposite sides of the axis 42. Plastic winding bobbins 77, 78 embrace two abutting arms of the core members and hold them against each other to form an "E" core. Windings 79, 80 are respectively formed on bobbins 77 and 78 and encircle the center leg of the "E". Each of windings 79 and 80 includes a primary winding and a secondary winding, wound together around the bobbin and the central leg. Leads 81 and 82 are the primary leads for the primary winding formed around bobbin 77. Leads 83, 84 are the secondary leads for the secondary winding formed around bobbin 87. Leads 85, 86 are the primary leads for the primary winding formed around bobbin 78. Leads 87, 88 are the secondary leads for the secondary winding formed around bobbin 78. Similarly, secondary leads 90, 91, 94 and 95, and primary leads 92, 93, 96 and 97 are provided for the sets of primary and secondary windings formed around respective bobbins in the Y axis power control means which will be connected among themselves in the same manner as for those in the X axis power control means.

Four inserts 300, 301, 302 and 303 of ferromagnetic material are spaced apart from one another and are inserted in the wall of the stylus, located in a portion 304 thereof which has insulating and dielectric properties. Inserts 300 and 302 are respective to the X axis power control means, and inserts 301 and 303 are respective to the Y axis power control means. Their movement toward one core member in one direction also constitutes movement away from the other, and a differential signal proportional to the movement can then be obtained from each of the sets of X and Y axis control means as a consequence of such movement, because of the effect on the impedance of the secondary coils. This is a conventional arrangement in the art, and is more fully described in the said Wenzel patent. Electric motors can be controlled as a consequence of this signal.

To secure this signal, the primary windings are energized with a reference alternating voltage. The secondary windings of the X and Y axis power control means are respectively interconnected in series by connecting leads 84 and 87, and leads 91 and 94. The primary windings are similarly connected by connecting primary leads 82 and 86 in the X axis power control means, and 93 and 97 in the Y axis power control means. The primary and secondary windings on bobbins 77 and 78 are identical, and the respective elements are equally spaced from axis 42. The interconnected secondary leads are those which, when the central axis of the stylus is coincident with the Z axis 42, energizing of the primary windings produces a unique output at secondary leads 83 and 88 (for the X axis power control means) and secondary leads 90 and 95 (for the Y axis power control means) when the respective primary winding is energized by applying voltage at primary leads 81, 85 or 92, 96, as appropriate, and the output from the respective secondary leads increases or decreases with lateral displacement of the stylus, and with the algebraic sense of the increase or decrease indicative of the direction of displacement. These signals, and a like signal from the Z axis power control means, are applied in the circuitry of FIGS. 9A and 9B to cause the operation of the respective motors.

The Z axis power control means 72 comprises a ferromagnetic slug 310 mounted between two insulating sleeves 311, 312 inside a passage 313 formed by coil member 314. The coil member may be a conventional linear voltage differential transformer. Its general construction is that of a primary winding and a pair of axially spaced-apart interconnected secondary windings wound with the primary winding. The details of construction are conventional. The secondary windings are serially interconnected in the same manner as those on bobbins 77 and 78, and for the same purpose. When the slug is centralized between them, at a null position along the Z axis, there will be a unique, perhaps zero, output from secondary leads 316 and 317. Movement of the slug 310 in one axial direction or the other means movement toward one of the secondary windings and away from the other. This differential movement gives rise to a signal at secondary leads 316 and 317. The primary winding is energized by an alternating current applied at primary leads 318, 319. The amount and direction of axial movement of the stylus up and down in FIG. 1 can therefore be sensed, and a power control signal can be obtained from the secondary leads of power control member 72, which is proportional to the axial shift of the stylus.

The components and directions of displacement of the stylus along the X and Y axes will be detected by respective windings of X and Y axis power control means 70 and 71. Components and directions of displacement of the stylus along the Z axis will be detected by the Z axis power control means 72. The power control means which are selected are energized by an alternating current in phased quadrature relationship to one another in accordance with conventional arrangements. The Wenzel patent shows such an arrangement.

The weight of the stylus is partially counterbalanced by a compressed coil spring 320. Spring 320 rests on a shoulder 321 in the body. The upper end 321a of the spring bears against a flange 321b which is attached to the stylus. The inner edge of the stylus mounting means 65 is clamped to flange 321b and thereby to the stylus by a retainer 322. The stylus mounting means 65 is the primary mounting means that supports the stylus for movement along the three axes. Spring 320 counterbalances some of its weight without causing the stylus to assume any unique position. By changing the compression (preload) on the spring 320, or substituting springs with different characteristics, or by using a stylus having a different weight, the endwise load exerted by the stylus can be adjusted or changed, and so can the force required to shift the stylus along the Z axis. Y axis limit switches 290, 291, X axis limit switches 292, 293, and Z axis limit switches 294, 295 are attached to the machine tool elements where they will be engaged at the end of a stroke in respective directions. They are adjustable so as to select the place they are actuated. These are well known devices which need no explanation here. When they are contacted, a current is passed by them or cut off by them to provide a signal which activates the axis selector means to realign the device and pick or trace in a new plane.

The electrical circuitry system which drives the various motors so as to cut metal at a substantially constant surface rate of feed is not a feature of this invention. However, instead, the method of tracing and picking, and the method of, and means for, causing the machine tool to move in the required directions for trace and pick cuts, constitutes the invention. Therefore, the circuit details of the tracer control system will be given only in briefest outline. This general circuitry is well known to persons skilled in the art, and a full exposition of a very analogous circuit is shown in Wenzel U.S. Pat. No. 3,582,749.

Figure 9A:
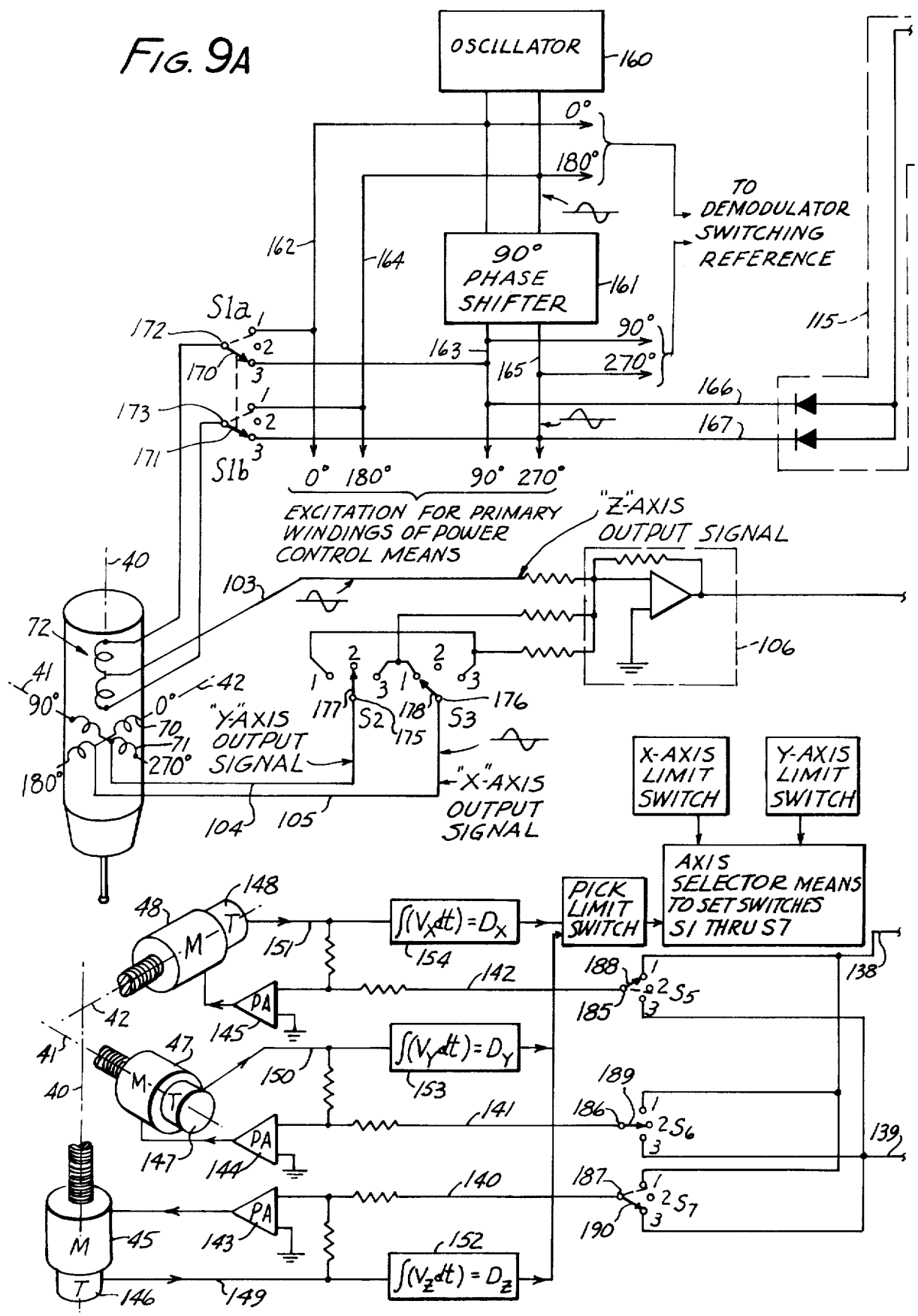

Z axis power control means 72, Y axis power control means 71, and X axis power control means 70 are schematically shown in FIG. 9A. This schematic showing indicates that the output of the power control means is derived from the interaction between a pair of secondary windings and the stator of the stylus, while the excitation of these windings is caused by reference sine wave alternating current applied to a respective primary winding (not shown in this schematic notation), all with proper phase relationships so that the phase relationships of the two axes which are selected to define the trace plane are at quadrature to another.

Figure 3:
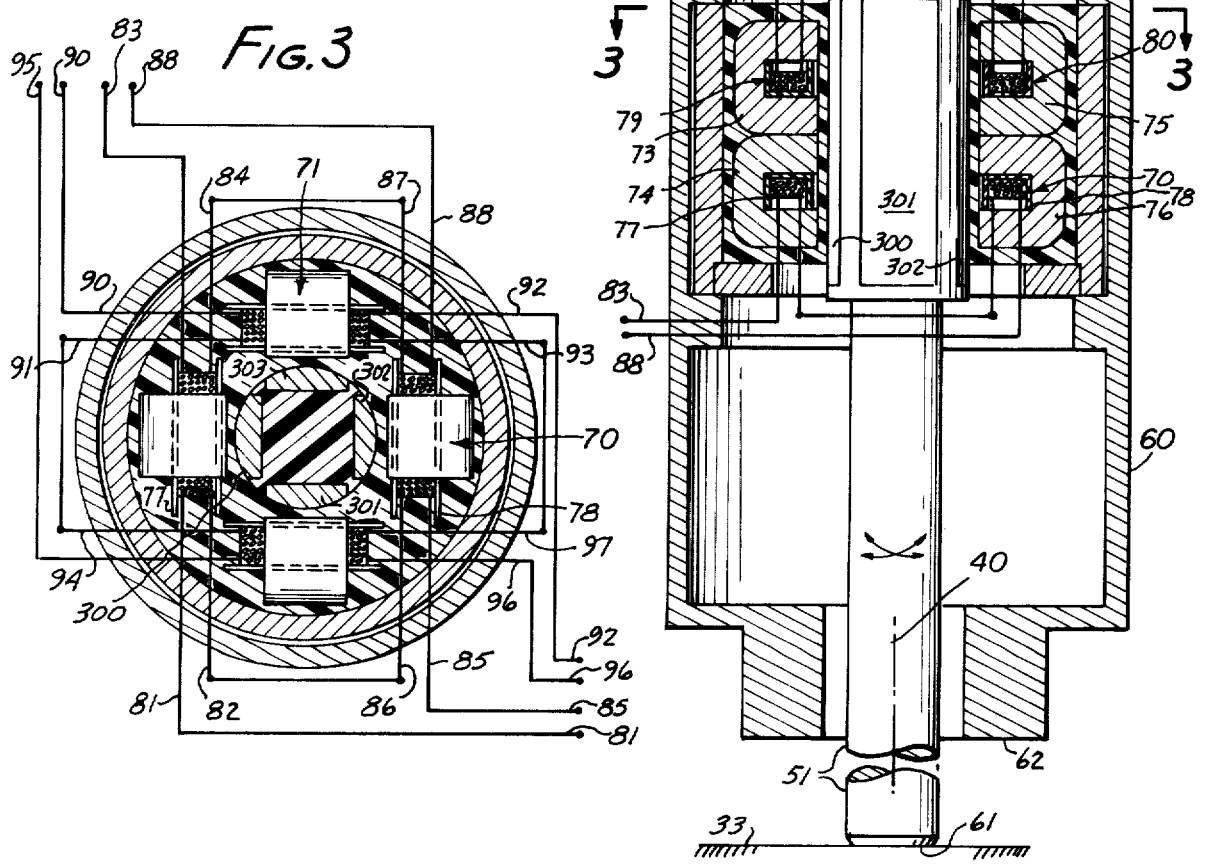
FIG. 3 is a cross-section, partly in schematic notation, taken at line 3—3 of FIG. 2.

When the stylus is shifted from its null position, then a signal is derived from the respective power control means which is proportional to the deflection and indicative of the direction of deflection. The signals are respectively applied to lines 103, 104 and 105 for the Z, Y and X axes, respectively. Lines 103, 104 and 105 schematically illustrate connections to the following pairs of secondary leads of the power control means of FIGS. 2 and 3: 316 and 317 (Z axis); 90 and 95 (Y axis); 83 and 88 (X axis). By the action of switching means yet to be described, selected ones of power control means output signals from lines 103, 104 and 105 are provided to a power control summing means 106, which comprises a summing amplifier which produces a combined alternating current signal from two of the power control means which is a sine wave whose amplitude is proportional to the total deflection of the stylus and whose phase is a function of the direction in which it is shifted from its null position.

The combined signal is provided to a center-tapped signal transformer 106a and is rectified by a rectifier 107 and is then provided through a choke 108 to a position error summing means 110 in the form of a summing amplifier. This summing amplifier sums the rectified combined head output signal from summing means 106 with a constant signal representing a "nominal deflection" provided from an operating deflection control 115 which provides an adustable output that is algebraically additive to the rectified signal from rectifier 107. This is applied to a position error modulator 120 at the center tap of a transformer which is energized by a pair of modulator switches 121, 122 (switches $SW_1$ and $SW_2$) under the control of the combined summed head output ac signals. Switches $SW_1$ and $SW_2$ close and conduct on a positive signal going through zero, and are open and prevent conduction on a negative signal going through zero. The output of the position error modulator is schematically shown as a square wave modulated position error signal which reflects the axial orientation of the position error of the stylus.

Line 125 carries the resultant vector signal derived from the power control summing means 106, but shifted 90° by means of a 90° phase shifter 126. A potentiometer 127 is adjustable to adjust the value of a feed command signal which is summed with the output from position error modulator 120 at a composite signal summing means 130. The output of summing means 130 is schematically shown by graph 131. This provides a composite signal of the position error and the feed command to the machine shown by the wave form 132. This singular signal is provided to demodulators 135, 136 (which can selectively be connected to 0° and 180° switching reference voltage and to 90° and 270° switching reference voltage, respectively) in order to resolve singular dc output signals proportional to the total components of the singular input signal in line 137 from the composite signal summing means 130.

In turn, these modulators provide dc signals on lines 138 and 139, respectively, through switching means yet to be described, so as to provide dc signals to the respective motors proportional to requirements for actuation of respective machine tool motors. Switches yet to be described are adapted to connect lines 138 and 139 respectively to motor lines 140, 141 and 142, respectively corresponding to Z, Y and X axis motors. In turn, these lead to power amplifiers 143, 144 and 145 which are respectively connected to the Z, Y and X motors. In turn, the Z, Y and X motors mechanically drive respective tachometer generators (hereinafter sometimes called "tachometers") 146, 147, 148 which feed back through tachometer lines 149, 150, 151 to distance measuring means 152, 153 and 154. These distance measuring means are all identical and will be separately described for only the X axis system 154 in FIG. 8.

The basic energizing of the tracer mechanism is derived from an oscillator 160 which produces an alternating current voltage with phases of 0° and 180°. A 90° phase shifter 161 is provided which shifts each of these to provide 90° and 270° reference voltage, and the various voltages are applied to lines 162, 163, 164, and 165, as indicated in the Figures. Lines 163 and 165 are connected by lines 166 and 167 to the operating deflection control 115.

Selector switch $S_1$ has two segments, $S_{1a}$ and $S_{1b}$. Each of these has three positions indicated 1, 2 and 3 which are contactible by contactors 170, 171, respectively. Throughout this drawing, a configuration for the tracing in the X-Z plane is shown with the switch contactors in solid line. The dotted line rendition of the contactor shows the changed position, where a change is required, for trace operation during pick movement in the Y-Z plane. Where no dotted rendition is shown, the switch is set as in solid line.

The common terminals 172, 173 of switch $S_1$ are respectively connected to the primary winding of the Z axis power control means for energizing the same. It is again repeated that the showing of the circuit connections in FIG. 9 is entirely schematic for the power control means and does not show their separate arrangement. The arrangement as shown will in fact work, it being a form of variable impedance device. What is shown as a center tap is, however, a schematic illustration of the signal from the secondary windings of the power control means. The symbolism is intended to be that of a secondary winding energized by a primary winding and sensitive to stylus deflection.

Further with regard to switch $S_1$, in segment $S_{1a}$, terminals 1 and 3 are connected to lines 162 and 163, and in segment $S_{1b}$, terminals 1 and 3 are connected to lines 164 and 165. Contactors 170 and 171 are always in contact with common terminals 172 and 173 and, by virtue of their ability to switch among the respective three terminals, can connect their common terminals to a source of either 0° or 90° voltage or to 180° or 270° voltage as appropriate. The contactors are ganged together. When in the No. 2 position, the Z axis is disabled. When in the 1 or 3 positions, the Z axis is enabled, and the appropriate phase relationships are provided by appropriate setting of switch 1.

Switches $S_2$ and $S_3$ are provided for selecting X and Y axis head output signals. Each has respective terminals 1, 2 and 3 and a common terminal 175, 176. Contactors 177, 178 are utilized to perform the selection. The illustrated example connects the X axis through terminal 1 of switch $S_3$ and disconnects the Y axis signal at $S_2$. Because of the connections at switch $S_1$ and $S_3$, the Z and X axis signals are provided to summing means 106 to trace in the X-Z plane. The alternate setting shown in dotted line selects the Y signal (the Z axis setting being changed only to secure quadrature), and the Y-Z plane is selected.

Switch $S_4$ is provided as part of a circuit to provide a feed command signal, and determines its direction, which can be reversed by reversing the switch setting from its contacts 1 to contacts 3. The feed command signal must be shifted 90° from the actual displacement of the stylus, and this is the purpose of phase shifter 126. Switch $S_4$ has two segments 177, 178 which provide for a reversal of selection of the polarities from lines 179, 180. This selection of polarity provides a means to determine the fundamental direction in which the feed control occurs.

Switches $S_5$, $S_6$ and $S_7$ have common terminals 185, 186, 187 and contactors 188, 189, 190. It is the function of these contactors to select for the respective motor which of lines 138 and 139 is to be connected thereto, or neither. The signals on lines 138 and 139 are available to some terminal of each of switches $S_5$, $S_6$ and $S_7$, so that there is a full range of selection. Switches $S_1$, $S_2$, $S_3$, $S_4$, $S_5$, $S_6$ and $S_7$ are sometimes called as a group "axis selector means" for selecting axes for the cutting plane.

The configuration shown is that for cutting in the X-Z plane, and the selector switch settings are those shown in solid lines for the contactors in this condition. At the end of a desired tool movement, which movement might be a trace cut in the X-Z plane, moved along the X axis, a limit switch may be struck, or a distance measuring device may signal the conclusion of the desired amount of movement (this is the situation in pick movement). Then the axis selector means is reset by conventional means (not shown) to select the axes for the next cutting plane. In the illustrated embodiment, this will cause the cutting plane to be changed to the Y-Z plane instead of the X-Z plane. This movement will continue until either the desired pick movement is completed, or a limit switch is struck, whereupon the circuitry will be returned to the condition shown in the solid line with the exception of switch $S_4$ which will be reversed to cause reversal of movement of one of the paths, and of switch $S_1$ which will be reversed to keep a quadrature relationship with the other axis. Pick movement is always made in the same direction, for example along the positive Y axis. In the cutting path selectible movement is usually bi-directional. Accordingly, the feed command movement is reversed by switch $S_4$ for alternate passes in this class of tracing. The means for changing the selector switch settings is entirely conventional and requires no description here.

Figure 4:
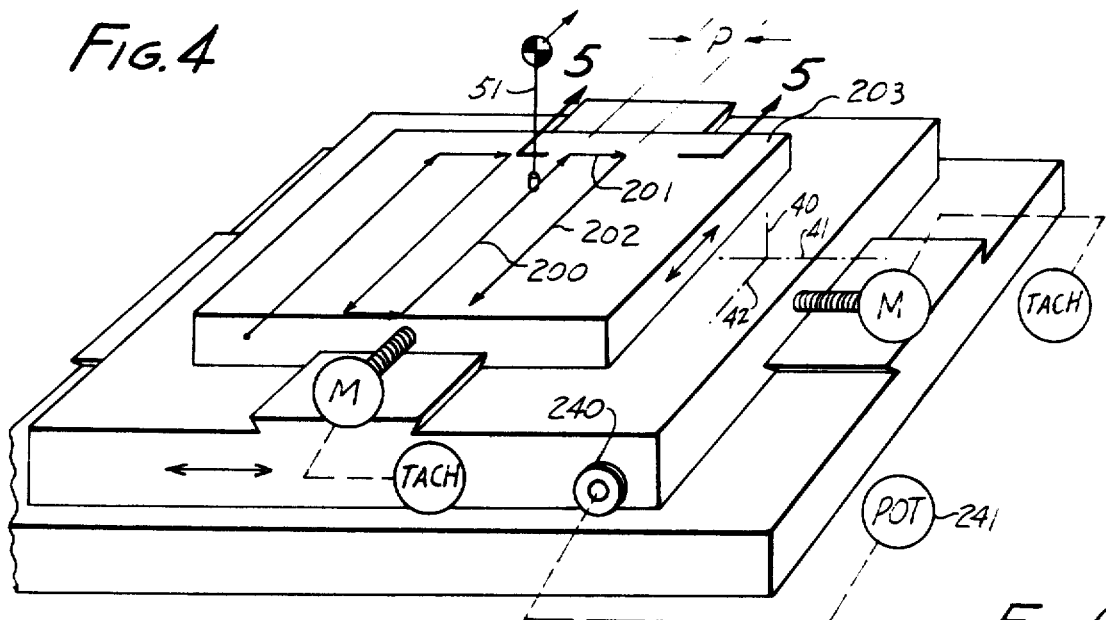
FIG. 4 is a schematic illustration of machine tool elements under control of the invention.
Figure 5:
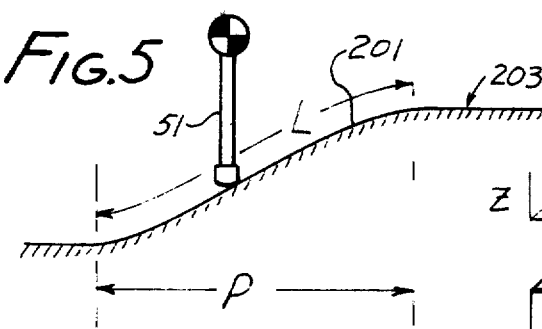
FIG. 5 is a schematic cross-section taken at line 5—5 of FIG. 4.

The foregoing describes the operation for tracing as shown in FIGS. 4 and 5, wherein a cutting path comprises a trace path 200, a pick path 201, a reverse trace path 202, and so on to create a path over the surface of a pattern 203 which is zig-zag in nature, with a pick distance "P" between adjacent cutting planes. Of course, the planes are very much closer together than shown in the Figures. The schematic showing in the Figures is given to illustrate the cycle, rather than an actual setup.

Figure 6:
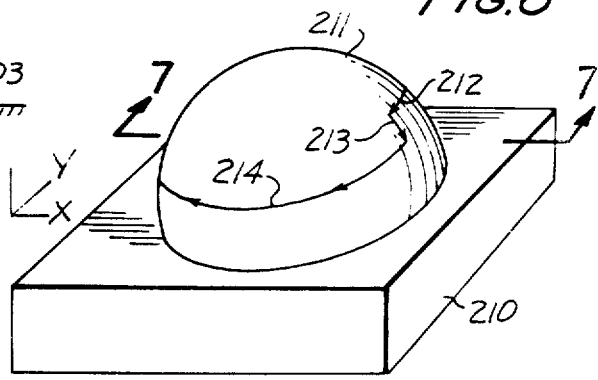
FIG. 6 shows a pattern which can be traced with this invention.
Figure 7:
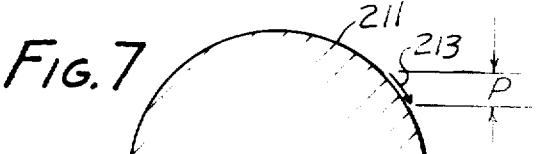
FIG. 7 is a cross-section taken at line 7—7 of FIG. 6.

Another type of tracing is sometimes called 360° tracing. A pattern is traced in one plane, and then the stylus is stepped to a new plane by a pick distance "P", and the cutting is repeated. This is shown in FIGS. 6 and 7, wherein a pattern 210 has a rise 211 being traced. For convenience, it is shown in the form of a hemisphere. The first trace cut will be in the X-Y plane and will be along a path 212 which goes around the contour of the pattern and completes a path around it until it returns to the X-Z plane. At this time, the pick movement will be downward by a given pick distance "P" (FIG. 7) to cut a segment 213 in the pick movement. After the pick movement is completed, the 360° tracing is resumed along segment 214. For the method of FIGS. 6 and 7, the switches selected will be for the trace cut to be made in the X-Y plane and the pick movement in the X-Z plane. For X-Y plane cutting, the switch segements $S_{1a}$ and $S_{1b}$ will be in the No. 2 (off) position, disabling the Z axis control. Switches $S_2$ and $S_3$ will be in their No. 1 positions, switches $S_5$ and $S_6$ will be in their No. 1 positions, and switch $S_7$ will be in its No. 2 (off) position. Switch $S_4$ is automatically manipulated to provide appropriate feed commands during the operation. Such a detail is unimportant to this invention. This configuration is the normal system setup for 360° tracing in a horizontal plane. When a pick limit switch or other limit means is actuated on the X or Y axis, in this case at the intersection with the X-Z plane, the axis selector switches will be changed to that which is shown in the solid line configuration in the drawings for tracing in the X-Z plane.

It should be noted that, when there is deflecion of the stylus along the X axis while in the X-Z tracing plane configuration, the knee trace direction would tend to trace upward in one direction of deflection and downward in the other. Since it is desired to pick in the upward or downward direction only as selected, the instantaneous X axis head output phasing is compared with the trace direction, and if a disparity is found, control logic will invert the output polarity in the trace feed command circuits so as to cause the tracing motion to correspond to that selected for the pick motion. This scheme is the equivalent of automatically changing the state of switch $S_4$ to correct and incorrect trace direction before it has occurred, and therefore, the automatic circuitry will not be described because it forms no part of the invention.

Any type of distance measuring means can be provided with this invention to indicate the completion of an intended travel, including means as simple as a friction wheel 240, shown in FIG. 4, adapted to roll along an adjacent machine tool element as the element to which it is mounted shifts along its respective axis. It turns the shift of a potentiometer 241 that can provide a signal indicative of distance travelled, and this signal can be utilized to terminate the pick movement as desired. Also, limit switches may be provided in accordance with common techniques.

Figure 8:
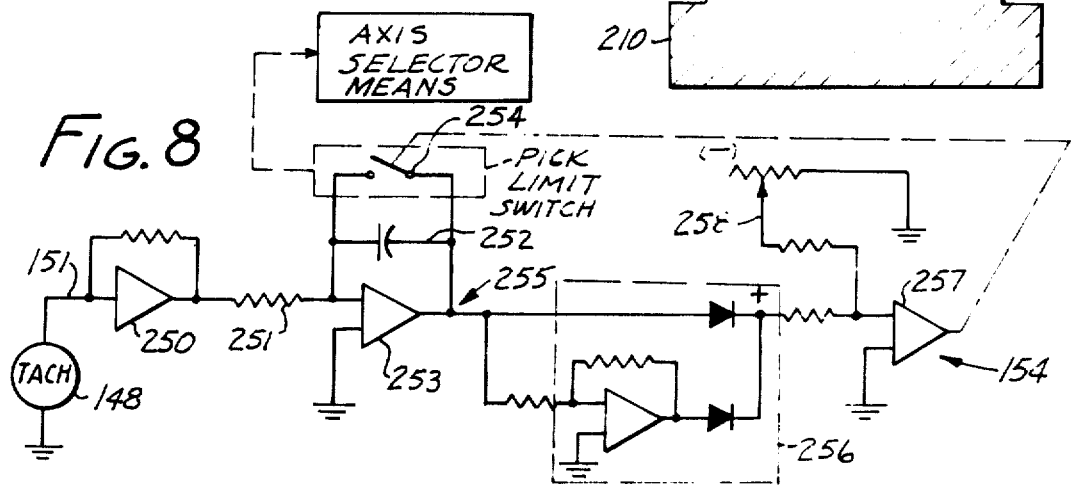
FIG. 8 shows an embodiment of distance measuring means useful with this invention.

A more sophisticated distance measuring means 154 (for the X axis) is shown in FIG. 8. The respective tachometer (tachometer generator) 148 is shown supplying its output to an amplifier 250 which provides its output through a resistor 251 to a capacitor 252 in parallel with an amplifier 253. The output signal from the tachometer is integrated at the capacitor (when pick limit switch 254 across it is open) to indicate distance travelled along the respective axis. The result is a gradually rising voltage at point 255 as a function of the distance travelled along the axis. When switch 254 is closed, there will be a zero output at point 255. A precision rectifier 256 rectifies the output from point 255 and applies it to a summing comparator 257, along with an input from a pick distance control 258, which is a potentiometer providing a fixed voltage, and of a polarity opposite to that of the precision rectifier. When the sum exceeds a reference voltage (perhaps zero) which is indicative of the attainment of the full distance, the comparator switches its condition abruptly. It is connected to pick limit switch 254 so it will close it at this time. This disables the distance measuring means, but equally importantly, switch 254 is connected by any suitable means to the axis selector means to actuate it and realign the circuitry to the next configuration, such as for a trace cut in the X-Z plane along segment 202. This next trace cut will proceed until completion. Its completion will cause a limit switch to be engaged at the end, and this will open switch 254, cause the axis selector means to select the pick plane, and start the next pick movement, which will continue until the pick is completed, and the action will again be repeated.

Attention is again directed to the fact that in the pick feed movement, the cutting speed along the surface of the template is substantially constant, because the movement is accomplished under the control of two power control means which are active in both of the axes that define the pick feed plane, just as is the case in the cutting plane of the trace cut. The circuitry shown in FIG. 9 does produce signals to the respective motors which cause the template to scan the pattern, and cause the cutter to cut along the workpiece, at a substantially constant rate of speed.

It is evident that limit switches and distance measuring means can both be provided for all axes. The axis selector means can be used to select the appropriate sets of limit switches and distance measuring means at the same time as it selects the power control means and makes the other requisite circuit alignments. The axis selector means may take the form of appropriate solid state logic circuitry, or may even comprise stepper-type selector switches, with the stepper switch aligning the circuitry by mechanical or electrical means as it is stepped from setting to setting by the actions of the axis limit switches and the pick limit switches. One example of a suitable stepper switch is shown in Weaver U.S. Pat. No. 3,228,424, if provided with electrically actuated means for shifting and rotating its stem.

FIG. 5 shows that a path length "L" in the pick movement can be much longer than the pick distance "P" measured along the pick axis. This Figure shows why it is necessary to slow down the pick axis when the path 201 rises in order to maintain the surface rate constant. The same would be true of a falling off of the slope of the pattern, but then there is no danger of gouging, but instead there is the danger of failing to track the pattern correctly. The terminology "to trace over the pattern" means to move along a path defined by the surface of the pattern. Customarily this means that the tip of the stylus traces over the pattern by moving along a path on the pattern itself.

The invention shown herein comprises apparatus and a method for making all trace cuts and pick movement cuts at a substantially constant cutting speed. It thereby overcomes the disadvantage in the prior art that the system may not be able to respond adequately, or at all, to changes of contour of the pattern, especially during pick movement.

This invention is not to be limited to the embodiments shown in the drawings and described in the description, which are given by way of example and not of limitation, but only in accordance with the scope of the appended claims.

We claim:

1. In combination: a machine tool including a frame and a movable machine element for supporting a pattern for movement along first, second and third mutually perpendicular axes; a first, second and third axis bi-directional motor adapted to drive the machine element along said first, second and third axes, respectively; a tracer mechanism mounted to the frame and including a body and a stylus having a tip adapted to trace over the surface of a pattern; mounting means mounting said stylus to the body, the stylus having a longitudinal axis which is generally aligned with the first axis, and is mounted for axial shifting movement along the first axis, and for lateral movement of its tip in all lateral directions from the first axis; first axis power control means, second axis power control means, and third axis power control means mounted to the body and responsive to components of stylus tip deflection along the respective first, second and third axes to control the application of power to the respective first, second and third axis motor in response to said stylus deflection; axis selector means for selecting two of the power control means and respective motors to establish a tracing plane in which the stylus traces the surface of the pattern in response to the two selected power control means; limit means defining the limit of travel of the stylus along the second and third axes and adapted to cause the axis selector means to select the previously-unselected one of the power control means and its respective motor and one of the previously selected power control means and its respective motor, thereby selecting a new cutting plane for pick movement over the surface of the pattern in response to the two power control means which are respective to the newly-selected axes; distance measuring means for terminating said pick movement at the conclusion of a predetermined distance of movement along one of the newly-selected axes, and adapted to cause the axis selector means again to select the first-named pair of power control means and their respective motors, whereby a pair of parallel paths for trace cuts are established which are laterally spaced apart by a pick distance, all movements in trace cut and in pick movement being under control of at least two power control means which tend to maintain substantially constant the surface rate of travel of the stylus over a pattern.

2. Apparatus according to claim 1 in which the axis selector means is adapted to include the first axis power control means and motor, in both the trace cut and pick movement.

3. Apparatus according to claim 1 in which the axis selector means is adapted to include the first axis power control means and motor respective to this axis only in the pick movement.

4. Apparatus according to claim 3 in which the axis selector means is adapted also to include the first axis power control means and respective motor also in the trace cut.

5. A method of operating a machine tool of the type which includes a frame and a movable machine element for supporting a pattern for movement along first, second and third mutually perpendicular axes, a first, second and third axis bi-directional motor adapted to drive the machine element along said first, second and third axes, respectively, a tracer mechanism mounted to the frame and including a body and a stylus having a tip adapted to trace over the surface of a pattern, mounting means mounting said stylus to the body, the stylus having a longitudinal axis which is generally aligned with the first axis, and which is mounted for axial shifting movement along the first axis, and for lateral movement of its tip in all lateral directions from the first axis, first axis power control means, second axis power control means, and third axis power control means mounted to the body and responsive to components of stylus tip deflection along the respective first, second and third axes to control the application of power to the respective first, second and third axis motor in response to said stylus deflection, axis selector means for selecting two of the power control means and respective motors to establish a tracing plane in which the stylus traces the pattern at a substantially constant surface rate of travel over the surface of the pattern in response to the two selected power control means, limit means defining the limit of travel of the stylus along the second and third axes and adapted to cause the axis selector means to select the previously-unselected one of the power control means and its respective motor and one of the previously selected power control means and its respective motor after said limit is reached, thereby selecting a new cutting plane for pick movement at a substantially constant surface rate of travel over the surface of the pattern in response to the two power control means which are respective to the newly-selected axes, distance measuring means for terminating said pick movement at the conclusion of a predetermined distance of movement along one of the newly-selected axes, and adapted to cause the axis selector means again to select the first-named pair of power control means and their respective motors, said method comprising: using said axis selector means, selecting said first two power control means and causing the stylus tip to trace the pattern in a trace cut at a substantially constant surface speed until a limit switch is encountered terminating the trace cut; using said axis selector means to select said second pair of power control means and causing the stylus tip to trace the pattern in a pick movement at a substantially constant surface speed until said distance measuring means indicates a predetermined distance movement, and using said selector means, again selecting said first two power control means and causing the stylus tip to trace the pattern in a trace cut parallel to from the first trace cut at a substantially constant surface speed.

6. A method according to claim 5 including selecting the power control means and motor respective to first axis for both the trace cut and the pick movement.

7. A method according to claim 5 including selecting the first axis power control means and motor respective to this axis only in the pick movement.

8. A method according to claim 7 in which the first axis power control means is selected only when the stylus tip lies in the plane corresponding to the axes of the power control means which define the plane of the pick movement.

* * * * *